UNITED STATES PATENT OFFICE.

WILLIAM H. BUNKER, OF LISLE, CANADA.

MANUFACTURED PEAT.

No. 806,868.     Specification of Letters Patent.     Patented Dec. 12, 1905.

Application filed February 17, 1905. Renewed November 15, 1905. Serial No. 287,483.

*To all whom it may concern:*

Be it known that I, WILLIAM HOWARD BUNKER, of Lisle, in the county of Simcoe and Province of Ontario, Canada, have invented certain new and useful Improvements in Manufactured Peat; and I hereby declare that the following is a full, clear, and exact description of the same.

The peat in a complete state of decomposition so far as vegetation is concerned is taken from the peat-beds and mixed with a proportionate quantity of combustible fibrous matter—such as straw, grass, flexible roots, or easily-propagated wood—which when the mixture is molded into a block will effectively bind the component parts into a homogeneous mass to facilitate the handling of the fuel for commercial and other purposes. The peat taken from the surface of the peat-beds usually contains a large percentage of peat-moss, vegetable roots, and other vegetable matter of a fibrous nature; but this surface peat has not the heat-producing properties of peat obtained at a greater depth, which if not entirely free from fibrous vegetable matter is practically so; but this latter class of peat is difficult to handle, owing to the non-adhesiveness of its particles, in a dry state, and the object of the present invention is to combine with the peat a proportionate amount of combustible fibrous matter which will effectively bind the particles of the peat together into a homogeneous mass when solidified under a heavy pressure and hold them together for handling and shipping purposes, the combustible fibrous material being assisted in binding the mass together by mixing with the peat when in its dry state a quantity of vegetable seeds, which will naturally thrive upon the plant food contained in the peat to send forth living roots and fibers.

In carrying out the invention the peat is taken from the bog or peat-beds and is mixed in the condition in which it is obtained with a quantity of seeds—such as oats, barley, wheat, or other similar grains—or with roots, shrubs, or tree branches in short lengths and also with a quantity of combustible fibrous vegetable matter—such as grass, straw, &c.—which would hold the pressed peat together, wild grass being preferable for this purpose, owing to its adhesive nature.

The peat when taken from the peat-beds contains greater or lesser quantities of insect life in its different phases, which if permitted to exist in the manufactured fuel would in the course of time destroy the homogeneity effected by the fibrous vegetable matter and reduce the fuel to a granular or powdered state, and to destroy the insect life within the fuel simultaneously with the mixing of the component parts is the secondary object of the invention, which is accomplished by introducing into the mixture a caustic substance, preferably lime in a powered condition, in sufficient quantities to exterminate the insects without impairing the heat-producing properties of the fuel or interfering with the growth of the seeds therein.

After the peat, fibrous vegetable matter, seeds, and caustic material have been intimately mixed the mixture is molded into blocks or briquets with sufficient pressure to solidify it into a homogeneous mass, dependent for the time being upon the adherent properties of its components, and these blocks or briquets are then piled where the moisture will evaporate or dry out, the evaporation or drying process being assisted by the growth of the seeds in the peat, the roots of which naturally spread in all directions, interlock, and form a mat or network to effectively prevent the disintegration of the molded mass, either during or after the process of evaporation. The roots of the growing seeds by feeding upon the moisture in the fuel not only produce a mat to bind the component parts together, but also accelerate the drying process by the absorption of the moisture in the material and render the peat fit for fuel at a comparatively early period. After the absorption and evaporation of the moisture in the fuel the growing vegetation dries and forms a combustible element, which adds to its calorific value. These blocks or briquets make an excellent building material, as the vegetation when the bricks are built into and exposed to the weather will continue its growth and bind them into a solid mass from the top to the bottom of the structure, the absorption of the rain beating against the wall being sufficient to maintain the growth.

Having thus fully described my invention, what I claim as new, and desire to secure by Letters Patent, is—

1. A manufactured peat block, consisting of peat, combustible fibrous material, and fertile seed intimately mixed together, and compressed into a homogeneous mass.

2. A manufactured peat block, consisting of peat, combustible fibrous material, fertile seed, and a caustic substance intimately mixed together and compressed into a homogeneous mass.

Toronto, February 1, 1905.

W. H. BUNKER.

In presence of—
   C. H. RICHES,
   L. F. BROCK.